UNITED STATES PATENT OFFICE.

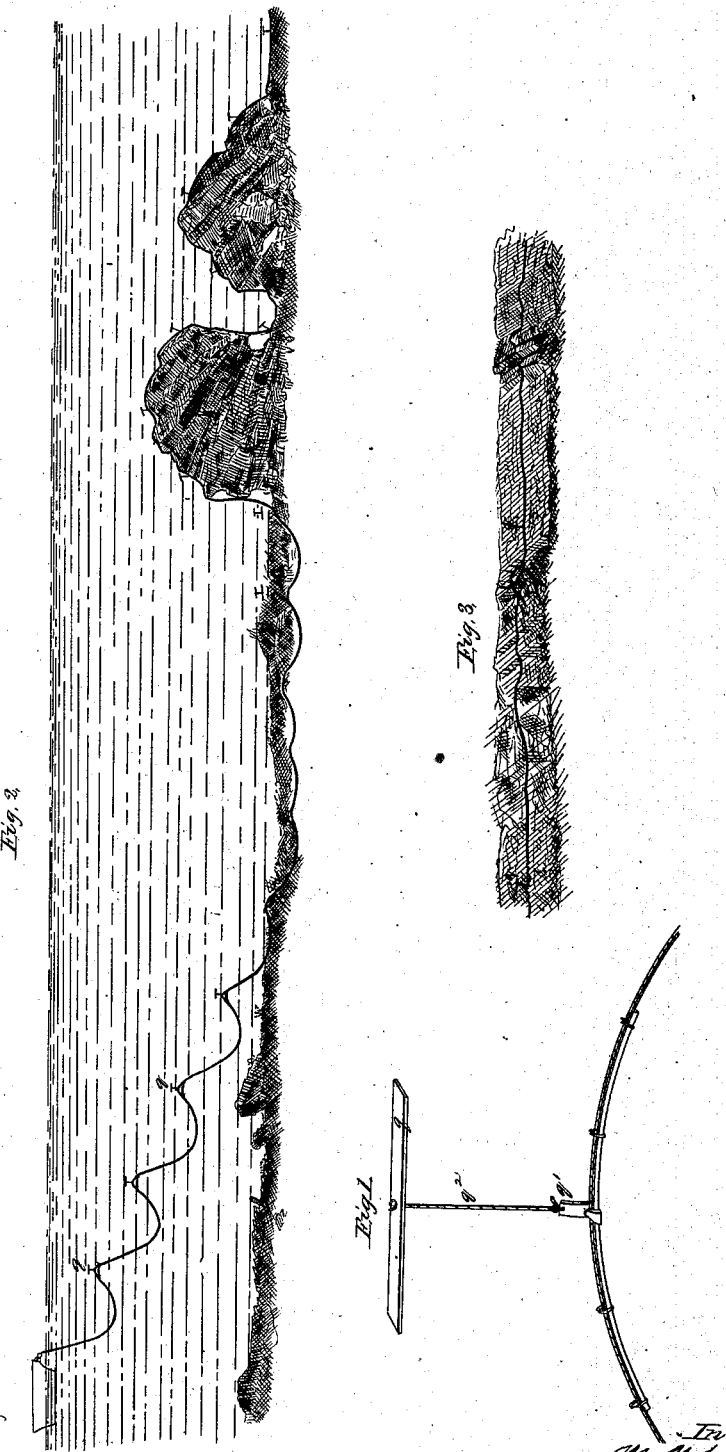

WM. H. HORSTMANN, OF BROOKLYN, NEW YORK.

IMPROVEMENT IN LAYING TELEGRAPH-CABLES.

Specification forming part of Letters Patent No. 26,677, dated January 3, 1860.

*To all whom it may concern:*

Be it known that I, WILLIAM H. HORSTMANN, of Brooklyn, in the county of Kings and State of New York, have invented a new and useful Improvement in Laying Cables for Telegraph Purposes Under Water; and I do hereby declare the following to be a full, clear, and exact description thereof, referring to the accompany drawings, in which—

Figure 1 is a view of one of the buoys or floats. Fig. 2 is a cable being submerged; Fig. 3, a plan of submerged cable.

My improvement consists in properly suspending the cable after it is paid out from the vessel by floats and then allowing it gradually to settle to the bottom or bed of the ocean in curves or festoons, as seen in Fig. 2.

The process and construction are as follows: After the cable passes the last apparatus, either for checking or manufacturing, it receives upon it at proper intervals certain buoys or floats, $q$, that serve to support it and allow it to sink more gradually and with less strain than would otherwise be the case, suspending it in festoons or curves from float to float, and so causing it gradually to descend to its bed, and allowing the inequalities of the surface on which the cable finally rests to take up the curves without any chance of breaking the cable.

The floating supports $q$ are made as follows: There is a flat hook, $q'$, that is hooked onto the cable filled with pitch, so as to adhere thereto. This hook is suspended from the center of the float $q$ by a cord, $q^2$, the float being a plain flat board. The cord $q^2$ is brought to the end of the float and there fastened by a loop of ribbon or tape, the tape being affixed to the board by wafers or glue that will dissolve quickly in water. In this condition the float is launched with the cable and for a time descends with it endwise; but as the tape loosens the cord $q^2$ is freed, and then the board becomes a powerful resistant to the rapid descent of the cable. These floats, placed a mile, more or less, apart, will greatly relieve the strain of the cable upon the vessel.

Having thus fully described my improvement, what I claim therein as new, and for which I desire to secure Letters Patent, is—

The floats $q$, attached and arranged, substantially as described, for the purpose of a graduated action, substantially as and for the purposes set forth.

WILLIAM H. HORSTMANN.

Witnesses:
   MALCOLM G. WEBB,
   JOSHUA WEBB.